United States Patent Office 3,057,146
Patented Oct. 9, 1962

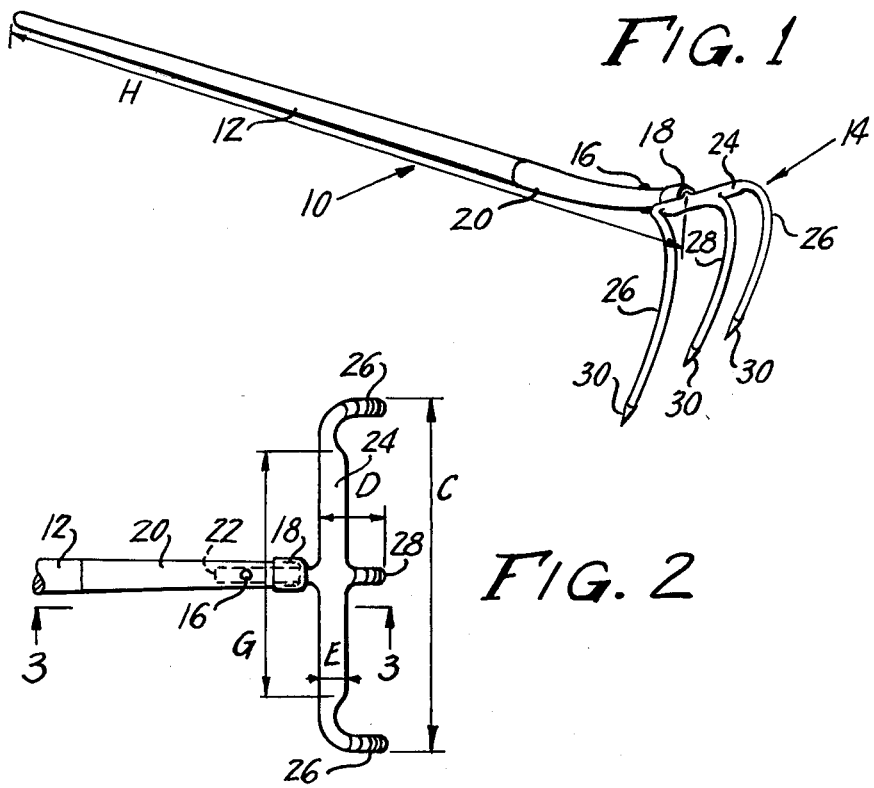

3,057,146
SPECIAL PURPOSE EAR CORN RAKE
Ardo T. Anderson, Kanawha, Iowa
Filed June 30, 1960, Ser. No. 40,046
1 Claim. (Cl. 56—400.01)

This invention relates to an ear corn rake with the special purpose of dislodging, loosening and expeditiously raking packed entangled ears of corn from a corn crib or pile to a conveyor-drag or elsewhere as a step particularly convenient in shelling the corn.

It is a matter of common knowledge that when ear corn is stacked in a corn crib or stacked in a pile, the husks become so intermingled and tightly packed together that separating the ears, as a step preparatory to shelling, involves painstaking and time-consuming efforts. This is especially so during cold weather when the ears become stuck together.

Picks, pitchforks, garden rakes and makeshift implements are used for untangling and dislodging husks. Thus, using an ordinary garden rake, the ears of corn are raked, in the usual hand fashion, from the crib or pile, as the case may be, to the conveyor-drag.

Despite the difficulties which are encountered year in and year out, and though there is crying need for special ear corn handling rakes, little, if anything, has been done to successfully cope with the problem. One solution was thought to reside in the adoption and use of a rake of a heavy-duty, but easily usable rake, such as illustrated in the patent to Nohl, No. 2,574,932, of November 13, 1951. This patented rake is made up of a number of separate integral details assembled together, and particularly features a rake back made of heavy channel iron and includes four widely spaced tines, each of which is a comparatively heavy length of metal having one end molded or secured to the channel iron, the tines being four inches apart.

This inventor has found that a light-weight, well balanced rake, with its dimensions very critical, as hereinafter set forth, with the length and shape of the tine critical, so as to provide perfect balance, light weight for easy handling, and much easier and less tiring to manipulate than the prior art rakes as shown by the above patent and by conventional garden rakes used for the same purpose.

The corn rake of this invention is built of very durable material, yet light in weight and well balanced. It is designed with three teeth or tines, for the purpose of always having a balance when raking of the corn is usually uneven. It is light in weight, this being very important as it has to be lifted up each time when corn is moved, and this requires a lot of energy and becomes a hard and tedious job. The teeth or tines are round, coming to a point, which has a tendency to protrude into the corn. The length of the tines is very important in balancing this tool, as well as the size of the teeth, and one of the outstanding features is the spacing and the curvature of the tines to give it perfect balance. The spacing of the tines and the curvature prevents wedging of the corn between the teeth. The proper angle of the tool in relation to the handle is also very essential for proper balance. This rake is designed with the rake head or back all one piece, light in weight, with the proper length of three tines, and spacing and curvature of the tines, and the angle of the back in relation to the handle, to give it perfect balance. The rake, when dropped into the corn, lends itself naturally to receive the corn without twisting or turning in the hand, and thus the operator does not have to fight to keep it from turning.

With the above and related objects in view, this invention consists in the details of construction and combination of parts, as will be more fully understood from the following description, when read in conjunction with the accompanying drawings, in which:

FIG. 1 is a perspective view, reduced in size, of the ear corn rake of this invention.

FIG. 2 is a top elevational view of the rake element.

FIG. 3 is a sectional view on line 3—3 of FIG. 2, showing how the rake is used.

FIG. 4 is a view at the rake end of the tool.

There is shown at 10 the special purpose ear corn rake of this invention. This ear corn rake 10 comprises a total of five different parts, a rake handle 12 as one major part, the rake per se, 14, as the other major part, and three minor parts, a rivet 16 and a ferrule 18, the third minor part being a thin sheath 20.

In the assembled ear corn rake, the handle 12 has its rake end reinforced by having the sheath 20 placed thereover; the end is hollowed to receive the shank 22 integrally extending from the rake per se, 14, and the end of the sheath 20 is substantially reinforced by the presence of the ferrule 18 thereon, while the rivet 16 extends through the sheath 20, the end of the handle 12 and the shank 22 to thus hold the entire assembly together, the ferrule 18, of course, being a pressure tight fit over the end of the handle and the sheath and thus assisting in securing the rake 14 to the handle 12.

The rake per se, 14, is made of suitable metal and is entirely an integral one-piece item, consisting of the shank 22, a flattened rake back 24 from the ends of which there extends integrally the two end tines 26, and from its midpoint there extends the mid tine 28 opposite the shank 22.

The tines 26 and 28 extend in a curve forwardly and downwardly away from the back 24 and then tend to straighten out and terminate in a point 30 directly below a right-angled projection from the rear or shank side of the flattened rake back 24, the point 30 itself being formed by conically bevelling the transverse sides and the forward side of each tine, so that the rear side, the side toward the shank, is not at all bevelled and the point is thus actually a projection of the most rearward longitudinal line of each tine 26 and 28.

In order to provide this ear corn rake with the proper balance, in addition to its being light weight and easily wieldable, the following have been found to be substantially critical dimensions. The tine points 30 are in a plane projecting substantially at right angles to the length of the handle 12 and the shank of the rake 22 from the rear edge of the rake back 24, as shown at A, and this distance A is eight inches.

The curved length of the tines 26 and 28 at B, from the forward side of the flattened rake back 24 is nine inches. The distance between the outer edges of the two outer tines 26 at C is eleven inches, the mid tine 28 being exactly between the two outer tines.

The distance from the rear of the flattened rake back 24 to the furthermost portion of the tines 26 and 28, as shown at D, is two inches.

The width of the flattened rake back 24, as shown at E, is seven eighths of an inch. The diameter of each tine, as shown at F, is seven sixteenths of an inch.

The distance between where the two outer tines 26 connect to the rake back 24, as shown at G, is nine inches.

The length of the handle 12, from the free end thereof to the end of the ferrule 18 as shown at H, is forty-eight inches.

The angle K between the line A connecting the rear of the rake back 24 to the tine 30, is substantially 90°. The bevel of the tine to the point 30 is approximately one inch.

It has been found in practice that the ear corn rake made according to these dimensions, with the three tines as shown and the handle as shown and the dimensions substantially that described, is very well balanced, is light in weight, receives the corn without twisting or turning the hand, and is very easy to use for long periods of time without overtiring the operator. The ears of corn shown in dotted outline at 32 are easily handled and raked by the rake 10 of this invention. The one-piece design of the rake per se makes its appearance neat and smooth, and very practical, and it has proven very satisfactory for ease of use.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

An easily wieldable light-weight, well balanced special purpose rake for dislodging, loosening and expeditiously raking intermingled ears of corn from a corn crib or a pile of stacked corn at corn shelling time comprising a short rake handle of non-metallic material having a hollow end, a metallic rake handle shank, means for securing one end of said shank in said handle hollow end, a flattened rake back extending integrally and transversely from said shank in a common plane therewith, a rake tine extending integrally from said rake back at each end thereof and at the midpoint thereof opposite said handle shank, each of said three tines extending slightly forwardly and curving downwardly and rearwardly to a point substantially vertically below said flattened rake back, the forward side of each tine adjacent its end being beveled rearwardly and the opposite sides being beveled inwardly to provide a tine point aligned with the rear side of the tine, said rake being well balanced and proportioned as a result of said handle being substantially four feet in length, the outer two tine points being substantially eleven inches apart, the size of each outer tine being substantially seven-sixteenths of an inch in diameter and nine inches in length, the vertical distance from said rake back to said tine points being substantially eight inches, the width of said flattened rake back being seven-eighths of an inch, the forward distance of said tines from the rear of the rake back being substantially two inches, the angle from the rake back to the tine points and the handle being approximately a right angle.

References Cited in the file of this patent

UNITED STATES PATENTS

| | | |
|---|---|---|
| 180,131 | Hertzig | July 25, 1876 |
| 1,845,222 | Birn | Feb. 16, 1932 |
| 2,028,001 | Moran | Jan. 14, 1936 |
| 2,421,990 | Bumgarner | June 10, 1947 |